Oct. 11, 1927.

J. E. PERRAULT 1,645,397

TIRE BUILDING MACHINE

Filed Sept. 22. 1924  12 Sheets-Sheet 1

Inventor:

Joseph E. Perrault, by Spear Middleton Donaldson & Hall
Attys.

Oct. 11, 1927.
J. E. PERRAULT
1,645,397
TIRE BUILDING MACHINE
Filed Sept. 22. 1924    12 Sheets-Sheet 2
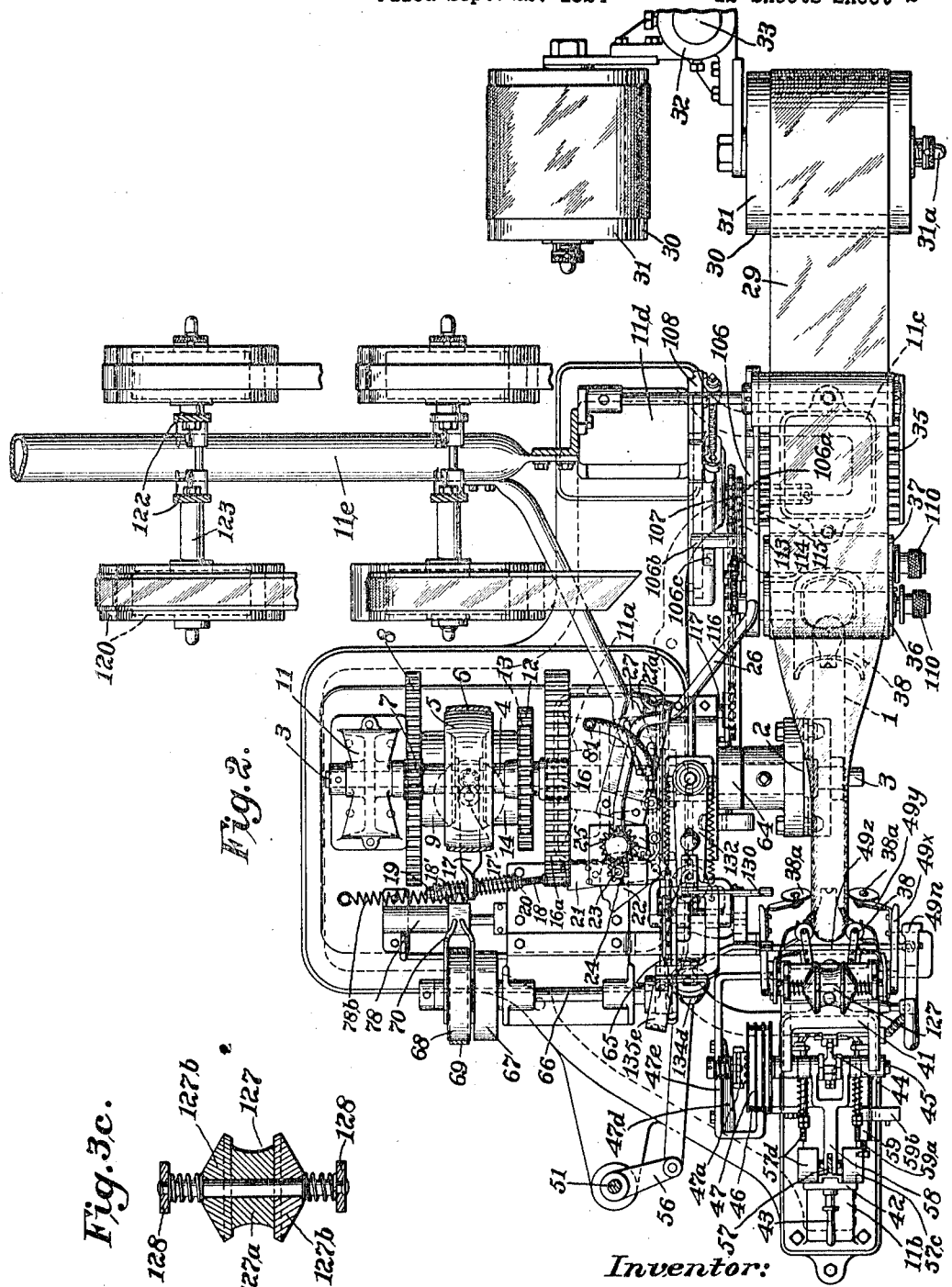
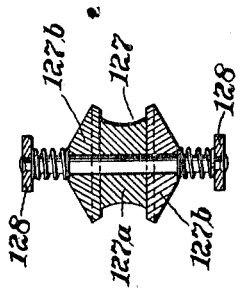
Inventor:
Joseph E. Perrault,
by Spear Middleton Donaldson & Hall
Attys.

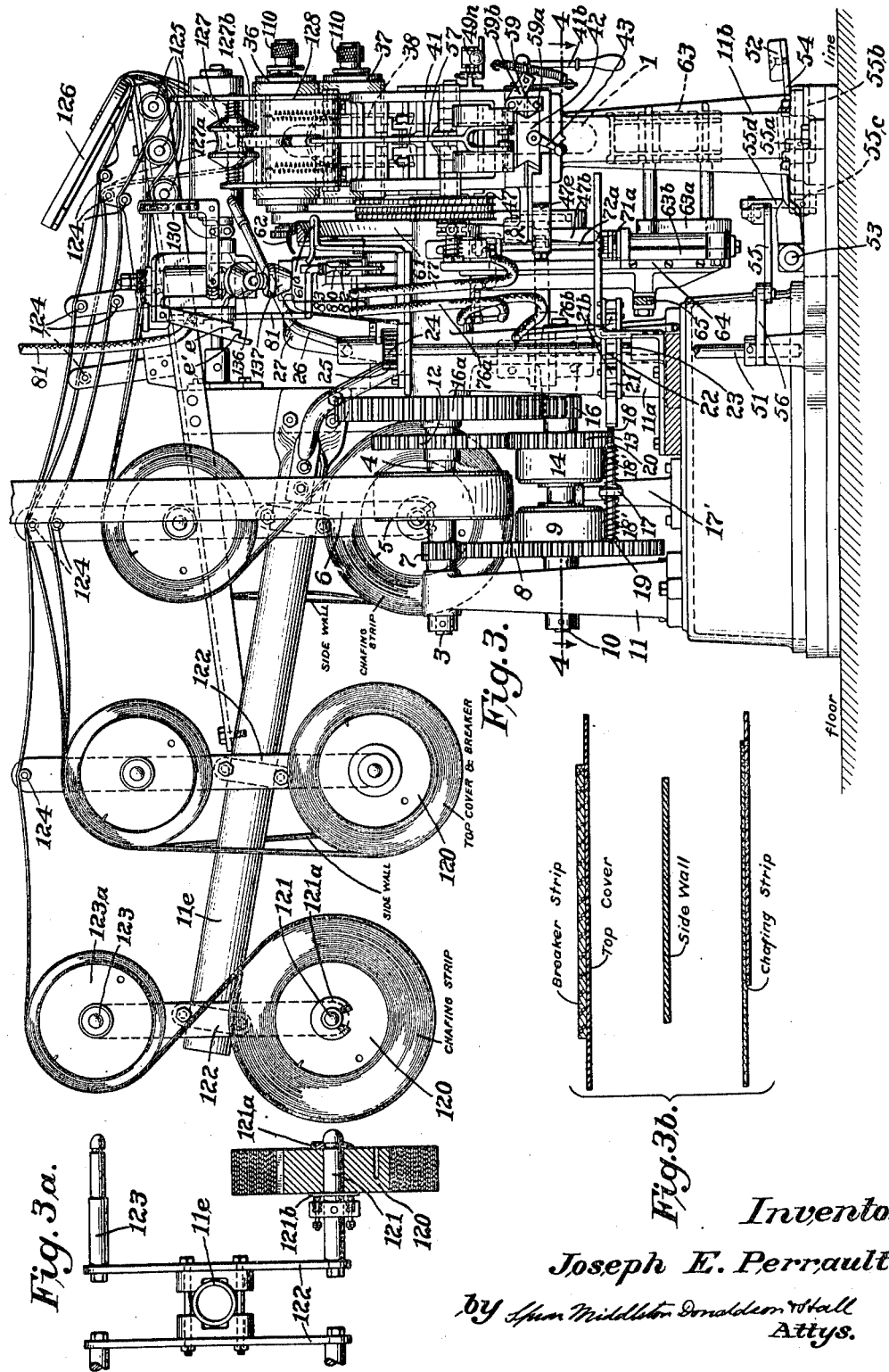

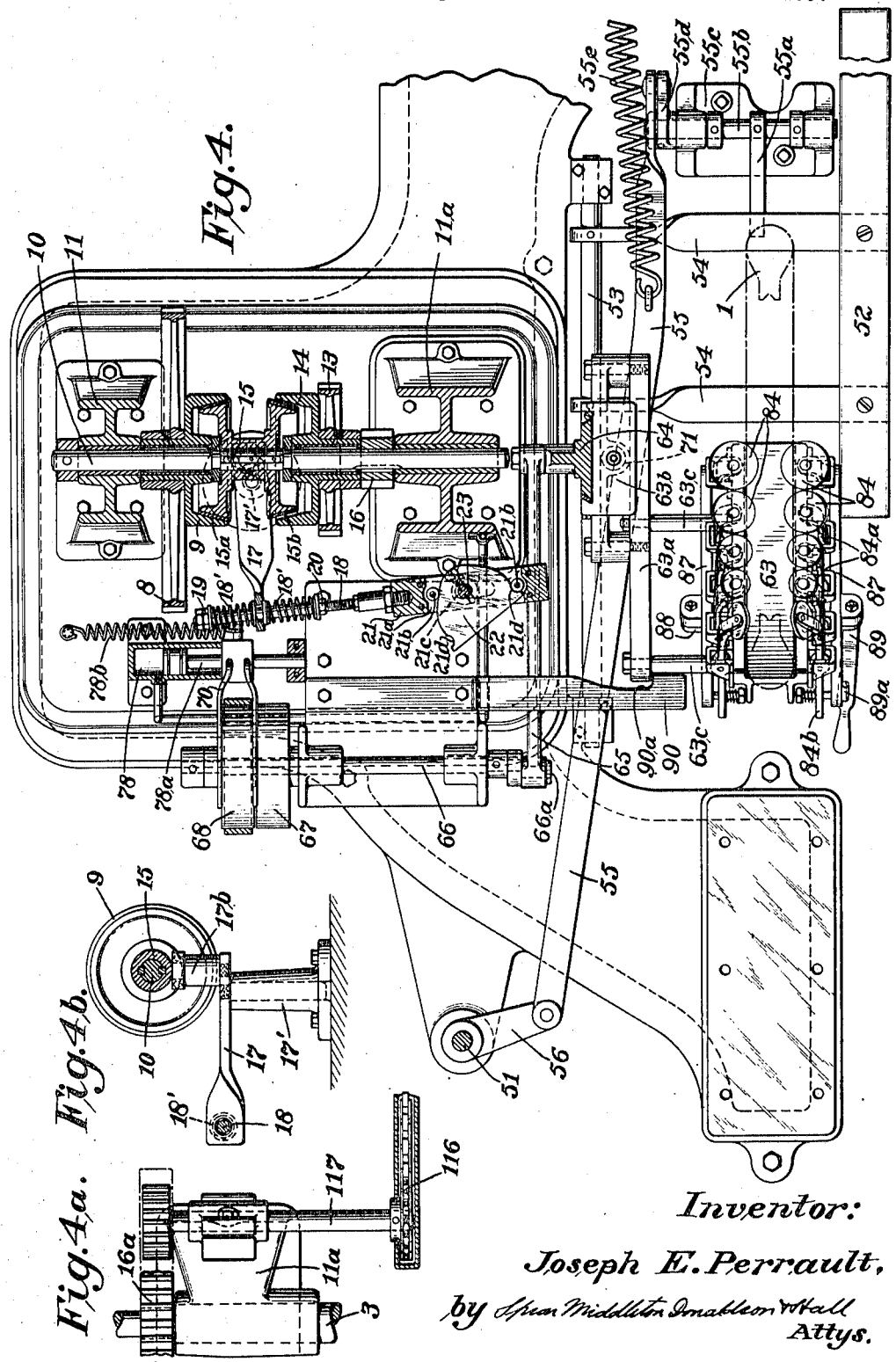

Oct. 11, 1927.
J. E. PERRAULT
1,645,397
TIRE BUILDING MACHINE
Filed Sept. 22, 1924
12 Sheets-Sheet 5
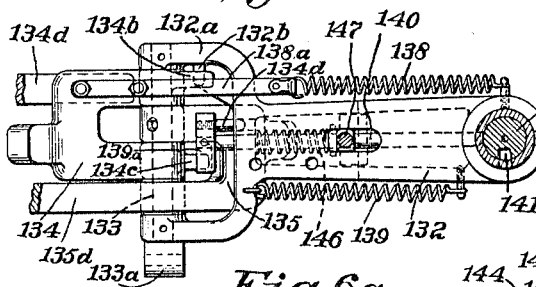
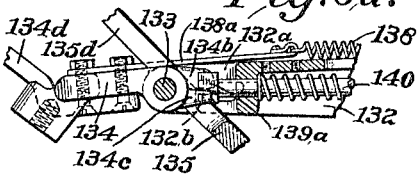
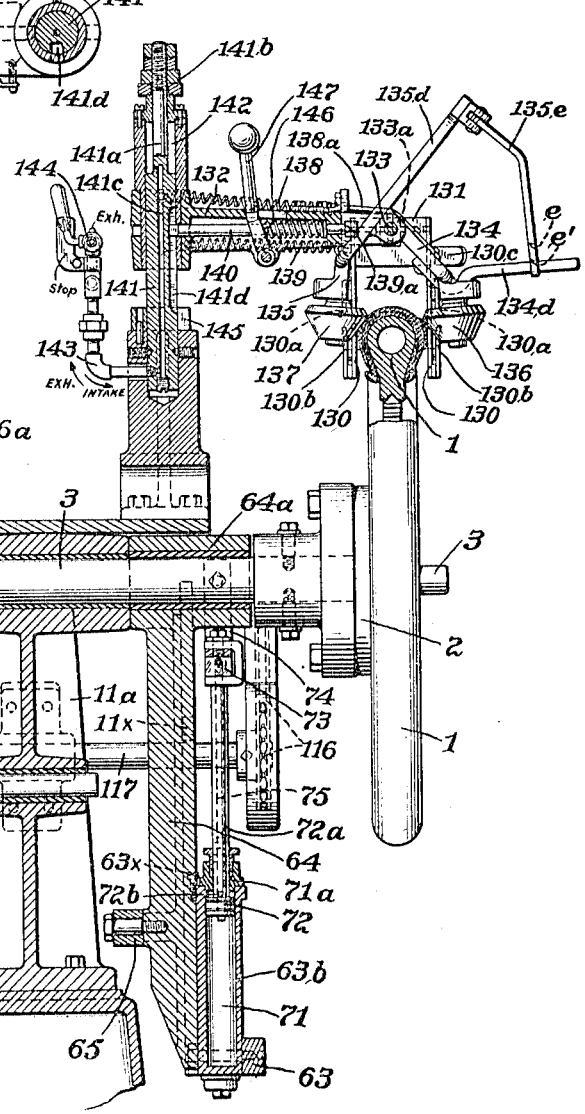
Inventor:
Joseph E. Perrault,
by Shan Middleton Donaldson & Hall
Attys.

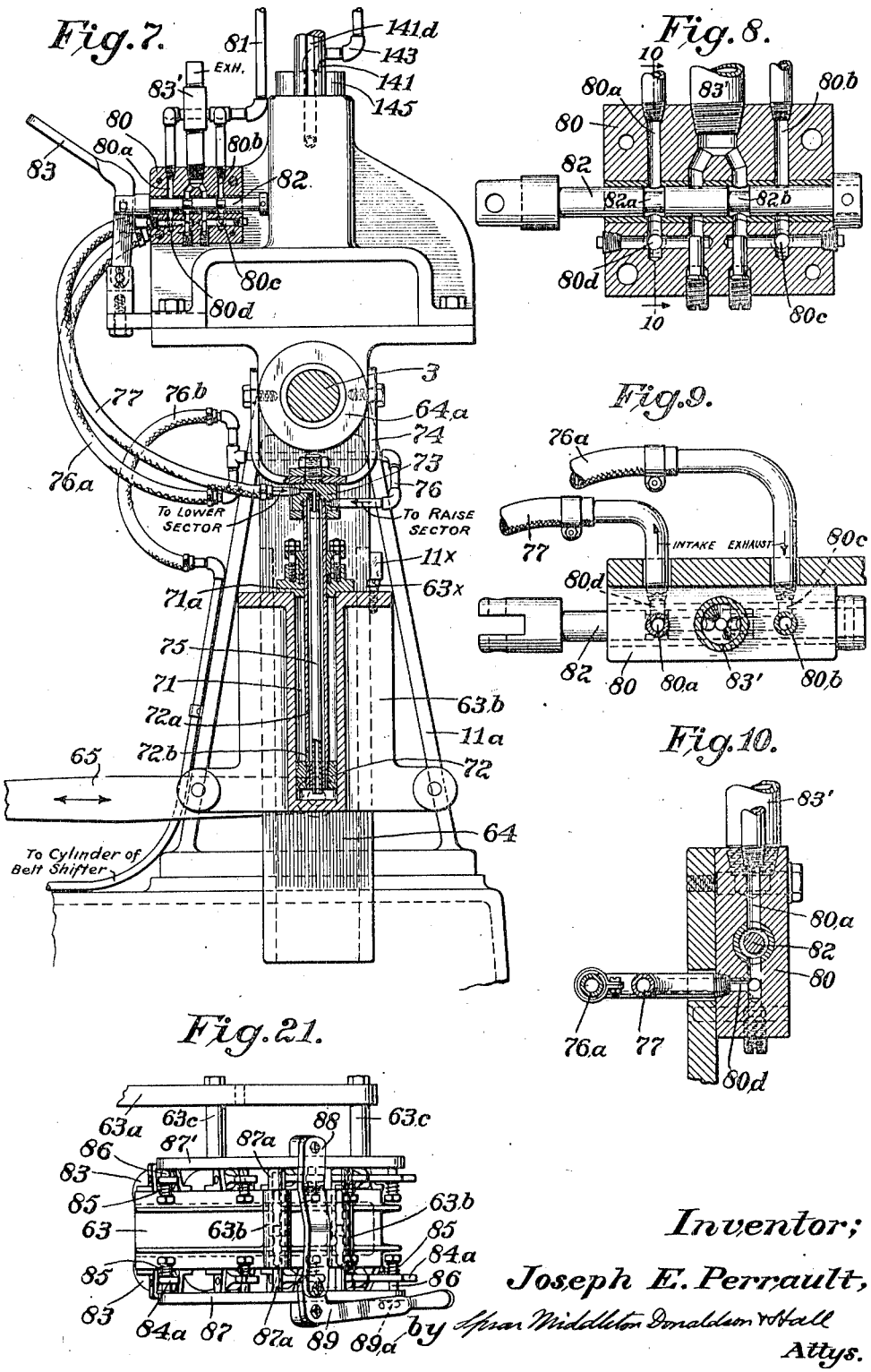

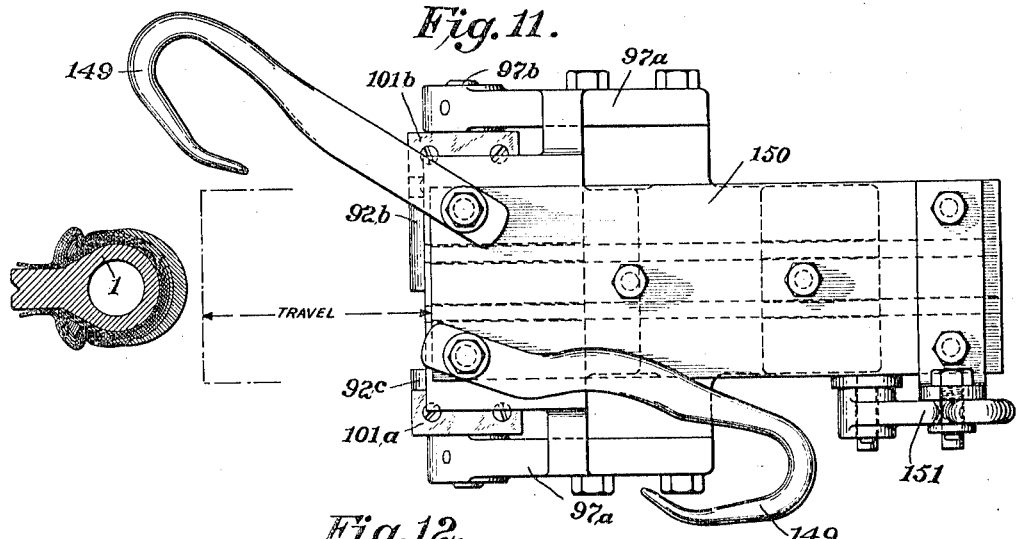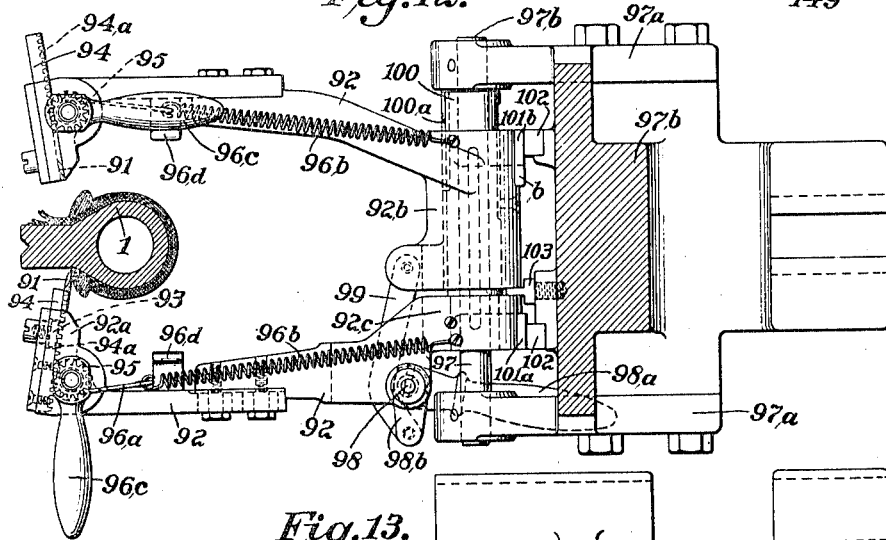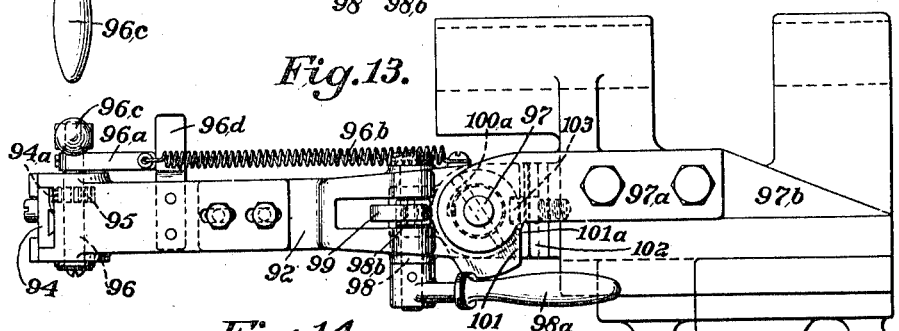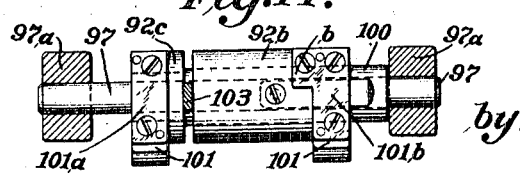

Oct. 11, 1927.
J. E. PERRAULT
1,645,397
TIRE BUILDING MACHINE
Filed Sept. 22. 1924    12 Sheets-Sheet 8
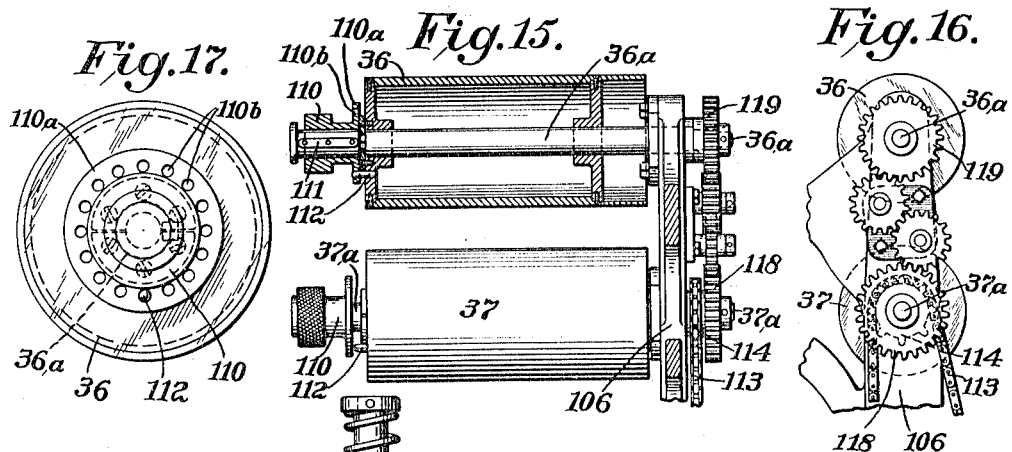
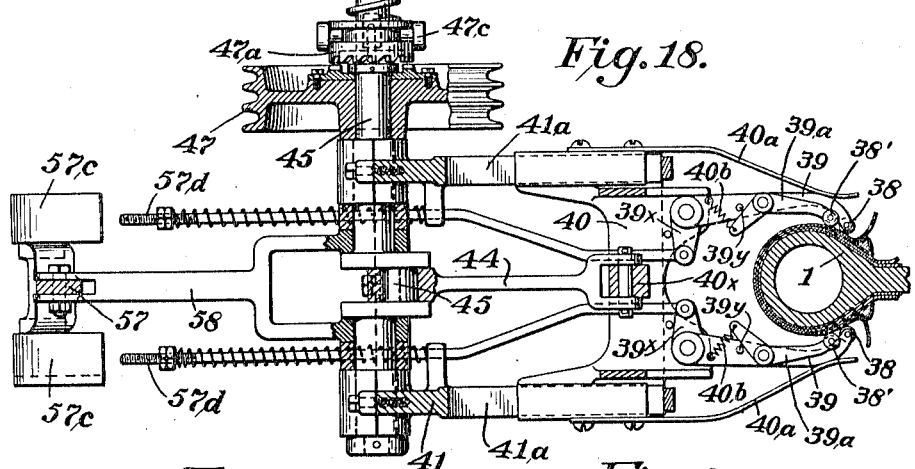
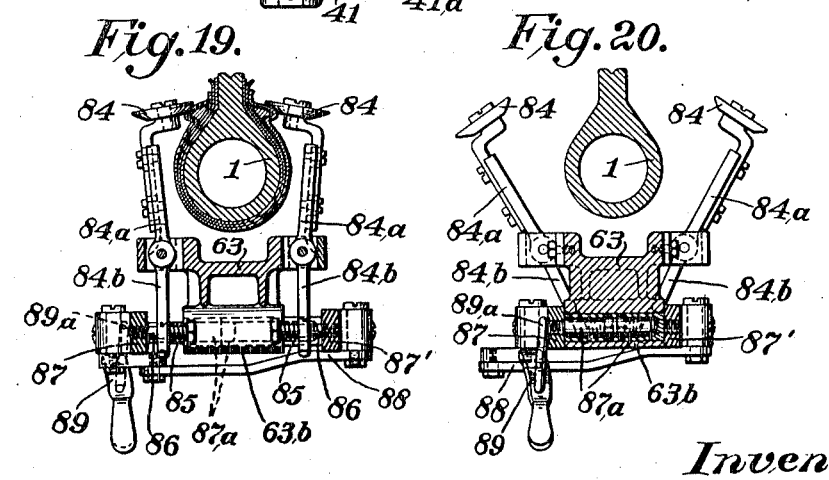
Inventor:
Joseph E. Perrault,
by Spier Middleton Donaldson & Hall
Attys.

APPLYING BEADS

APPLYING THIRD LAYER FABRIC

Inventor:
Joseph E. Perrault,

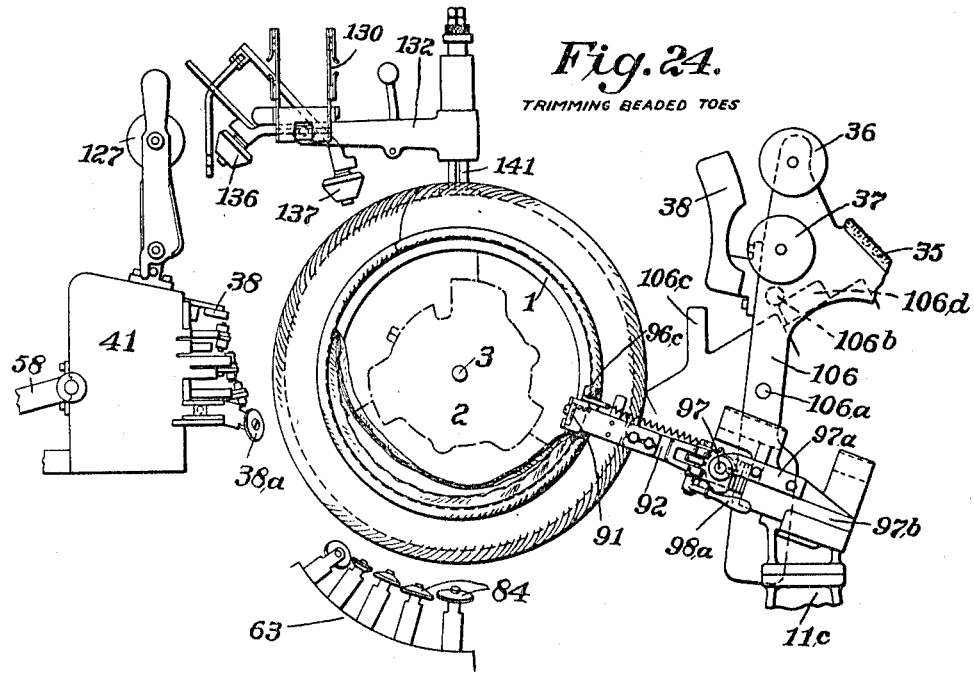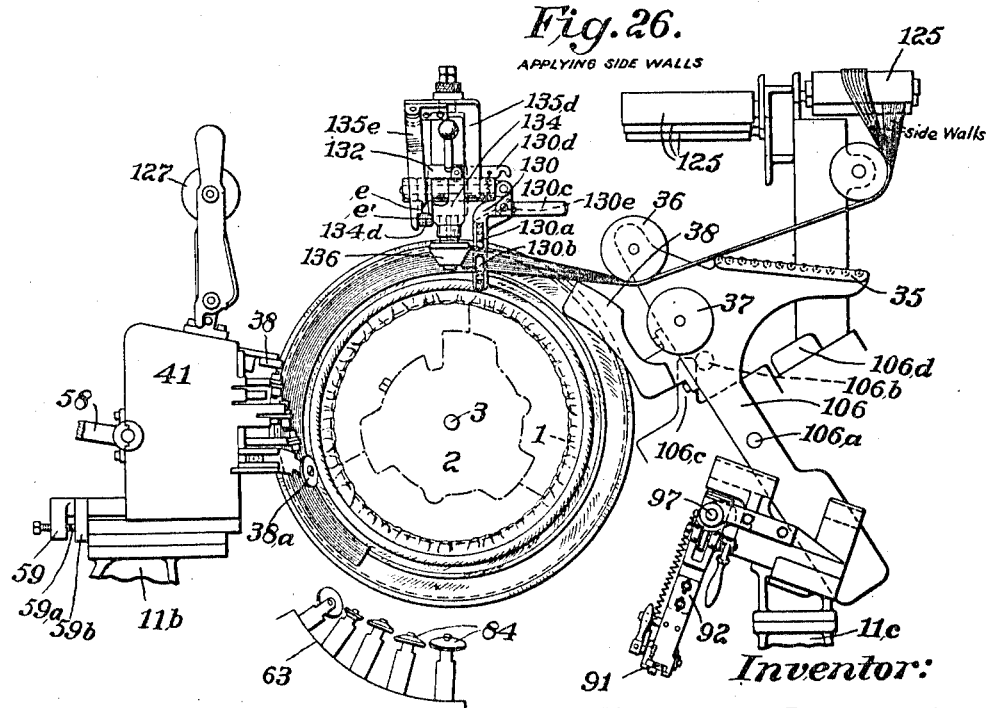

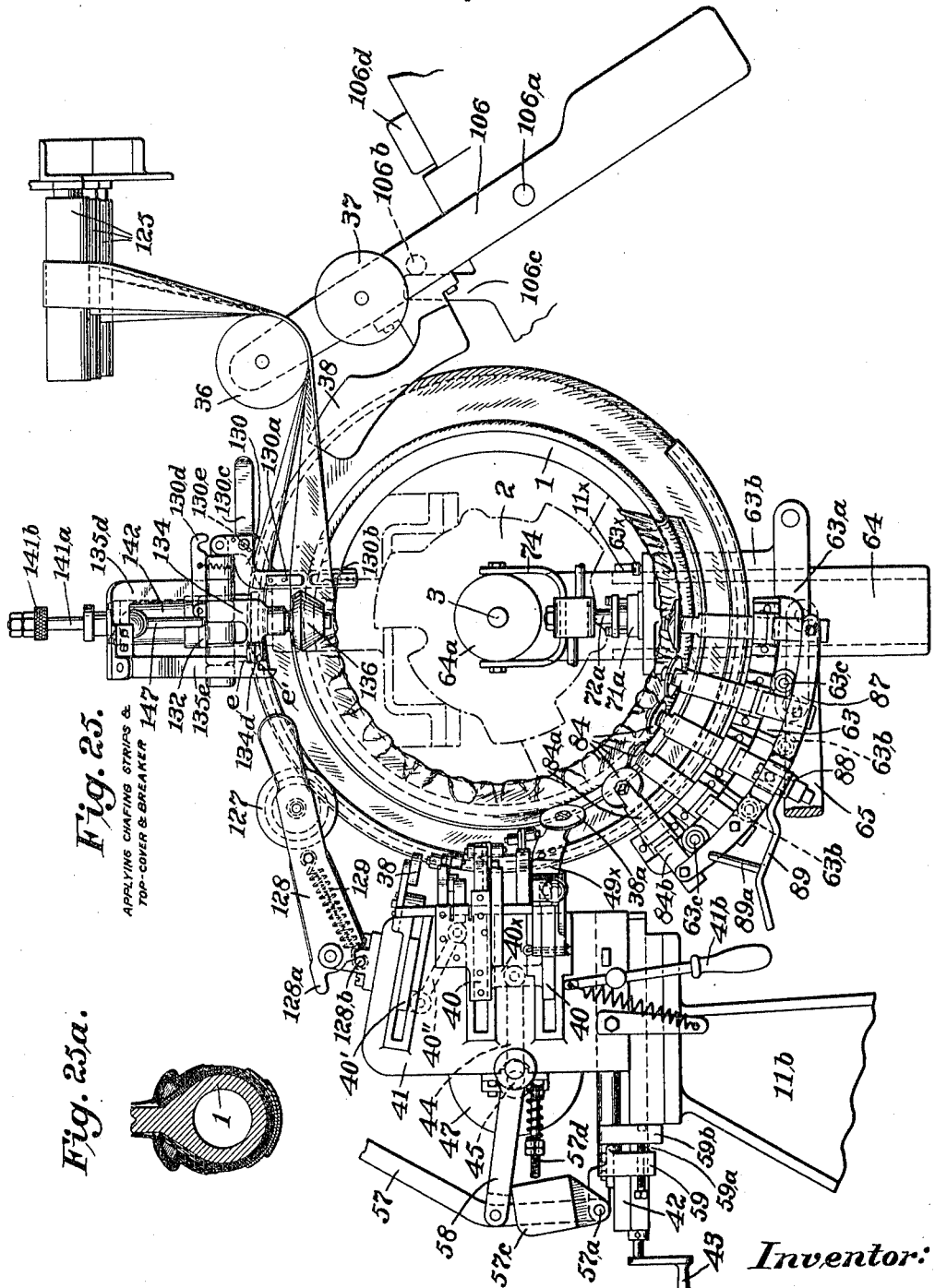

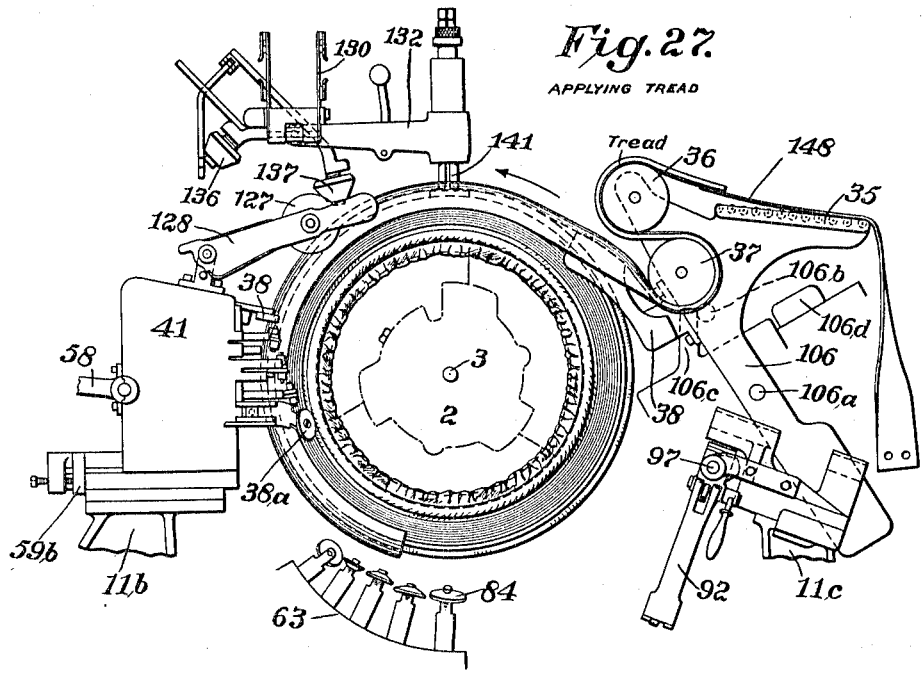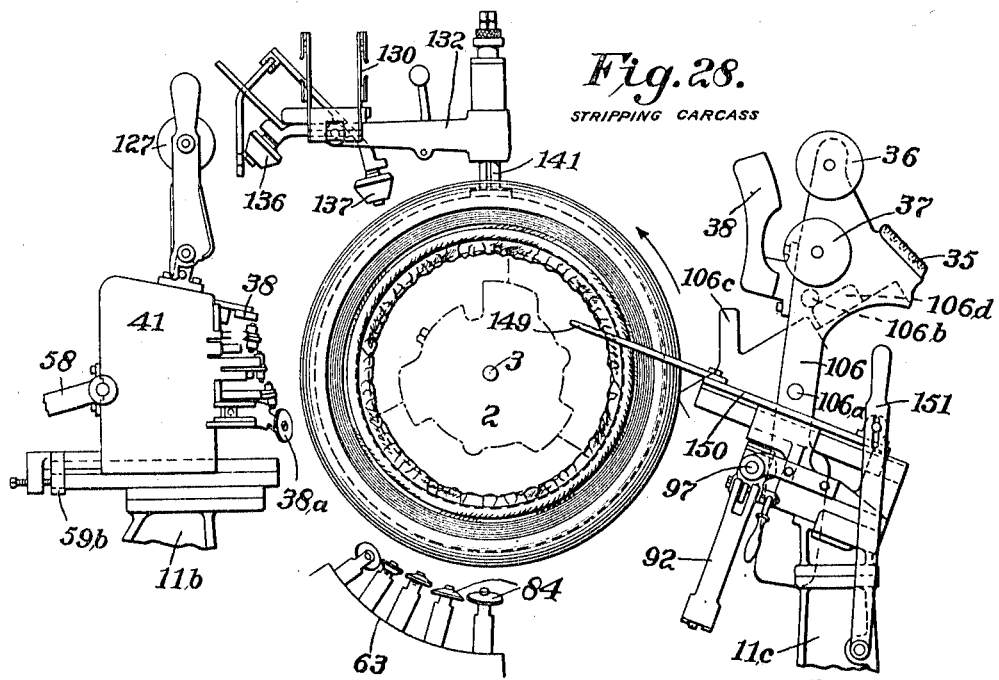

Patented Oct. 11, 1927.

1,645,397

UNITED STATES PATENT OFFICE.

JOSEPH E. PERRAULT, OF WATERTOWN, MASSACHUSETTS, ASSIGNOR TO HOOD RUBBER COMPANY, OF WATERTOWN, MASSACHUSETTS, A CORPORATION OF MASSACHUSETTS.

TIRE-BUILDING MACHINE.

Application filed September 22, 1924. Serial No. 739,192.

My present invention relates to improvements in tire building apparatus and has among its objects the following:

To provide an orderly and convenient means of building up a complete casing through a series of operations, all of which may be taken care of by a single operator.

To provide the various stock elements, carried on suitable drums or supply rolls, in convenient relation to core, so as to be readily brought into proper position to feed through tension rolls onto the core.

To provide a battery or group of finger-rollers for pressing down the various layers of stock as they are applied, said fingers being provided with a slight reciprocating movement to secure the best results, and also a pair of stitcher rolls associated with this same group but operable independently thereof, especially for pressing or stitching in around the channel and beads when they are placed in position.

To provide a battery of stitcher rollers mounted in a suitable sector, which is operated into and out of working position by compressed air, said stitchers being arranged in progressive order and under progressively increasing tension to meet the requirements, which stitchers are readily clamped to their work or released therefrom by a suitable hand lever.

To provide a pressure roll near the point where the material is laid on the core for pressing home the tread portion of the tire, said pressure roll being mounted on the frame of the machine and readily moved in and out of action, and made up of three component sections, a central concave portion to act on the breaker strip being applied, and two narrower discs on either side of the center member, provided with slightly beveled edges to act on the extreme edges of the top cover for pressing them down before they reach the finger rollers.

To provide application rolls at a point about in vertical line with the center of the core, which in their low position of working, utilize their upper, slightly beveled portions to press the top edges of the chafing strips firmly home, while in their high position of working, they utilize their lower and more sharply beveled portions to press the top edge of the side walls preparatory to the action of the finger rollers which complete this operation, the two positions being controlled by pneumatic action.

To provide positioning or centering rings for placing the beads in position, the back one being characterized by suitable centering lugs which fit snugly over a suitable collar or flange of the core-supporting spider, and the front one having arms centering in a hub portion provided with a hole which fits snugly over a center pin or stub projecting frontwardly from the spider.

To provide trimming knives at a convenient position about the core, said knives being mounted to move laterally inward in relation to the core and carried by a pivotal frame member which permits the knives to be swung upwardly and into proper position for their cutting or trimming operation, which takes place after the beads have been placed in position and the third and fourth layers of cord fabric have been rolled down into place.

To provide a foot treadle at the front of the machine most convenient to the operator for controlling the core driving and other mechanisms by suitable connections to a belt shifter overhead, said mechanism comprising suitable high and low speed spur gears mounted on a counter shaft, between which gears operates a double throw clutch, having a neutral position for stopping the revolution of the core, and said spur gears meshing with corresponding spur gears mounted on a main shaft in proper relation to the clutch shaft, provided with a main driving pulley driven from any suitable source of power, whenever the foot treadle is operated.

I have also aimed to provide other and various improved or novel features of construction which will appear from the following description.

What I at present consider the preferred embodiment of my invention is illustrated in the accompanying drawings, in which:

Fig. 2 is a plan view of the same.

Fig. 3 is an end elevation, with certain parts in section and others omitted for clearness of illustration.

Fig. 3ᵃ is a detail end view of the supply rack with parts in section.

Fig. 3ᵇ shows transverse sections in actual size of the top cover and breaker strip, the side wall, and the chafing strip.

Fig. 3ᶜ is a detail section of the composite pressure roll.

Fig. 4 is a sectional plan view, on an enlarged scale, taken on the line 4—4 of Fig. 3, with parts broken away and others omitted for clearness of illustration.

Fig. 4ᵃ is a detail of driving mechanism for operating the tension rolls.

Fig. 4ᵇ is a detail of the driving clutch mechanism.

Fig. 5 is a vertical central section, on an enlarged scale, through the main portion of the machine.

Fig. 6 is a detail plan view of the swinging arm and its associated mechanism for carrying the application rolls, on a still larger scale.

Fig. 6ᵃ is a fragmental section of parts of Fig. 6.

Fig. 7 is an enlarged front view of the stitcher sector operating arm and associated parts and mountings therefor, with parts in section.

Figs. 8, 9 and 10 are detail sections of the control valve for operating the sector arm, on a still larger scale, Fig. 10 being taken on line 10—10 of Fig. 8.

Fig. 11 is an enlarged plan view of the stripping mechanism in its retracted relation to the core and with the trimming mechanism lowered.

Fig. 12 is a similar view with the stripping mechanism removed, and the trimming arms raised to operative position, showing one of the trimming knives in operation.

Fig. 13 is a side elevation of the parts shown in Fig. 12.

Fig. 14 is a detail rear view of the trimming arms, showing the locking plates.

Fig. 15 is a detail of the tension rolls and train of gears for driving same.

Fig. 16 is a side view of the gear train and rolls from the right of Fig. 15.

Fig. 17 is an enlarged end view of one of the tension rolls and its locking clutch.

Fig. 18 is an enlarged detail plan section of the head and operating mechanism for the finger-rollers, showing the slide upon which they are mounted and the rollers in working position upon the tire carcass.

Figs. 19 and 20 illustrate detail cross-sections of the stitcher sector, with the stitchers closed for operation upon the tire structure and open for clearing the same as in raising or lowering of the sector.

Fig. 21 shows in detail the bottom plan of the sector.

Figure 22:
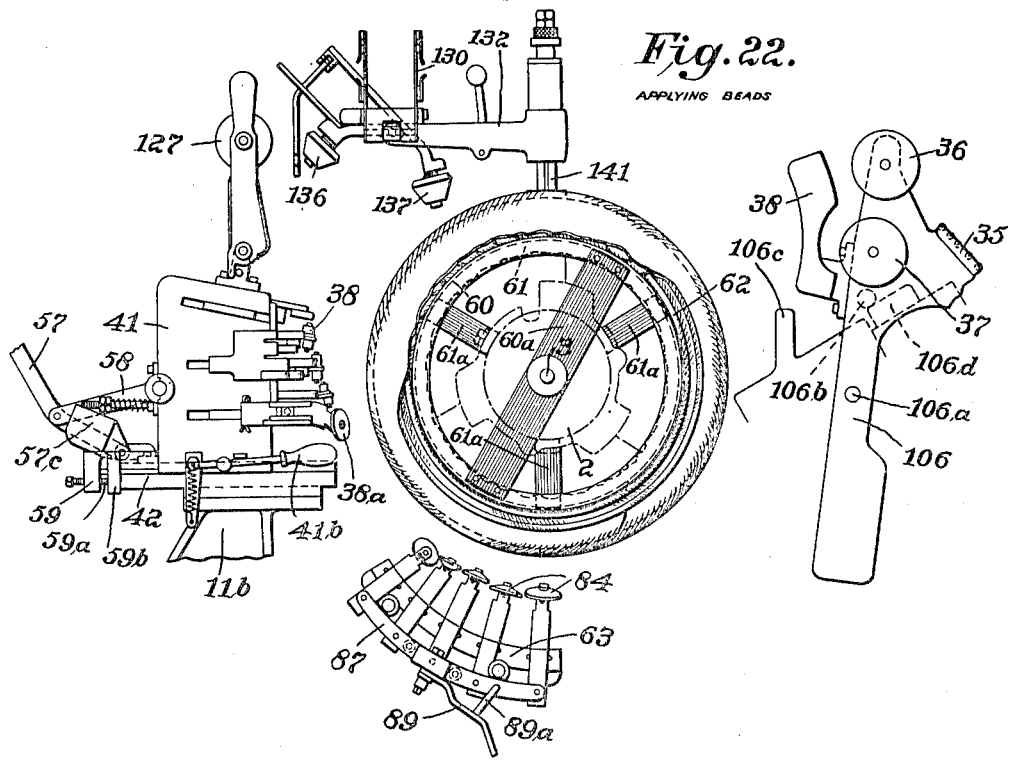

Fig. 22 illustrates in diagrammatic fashion the principal elements of the machine adjusted to their proper position to apply the beads, after the first and second layers of fabric have been applied.

Figure 23:
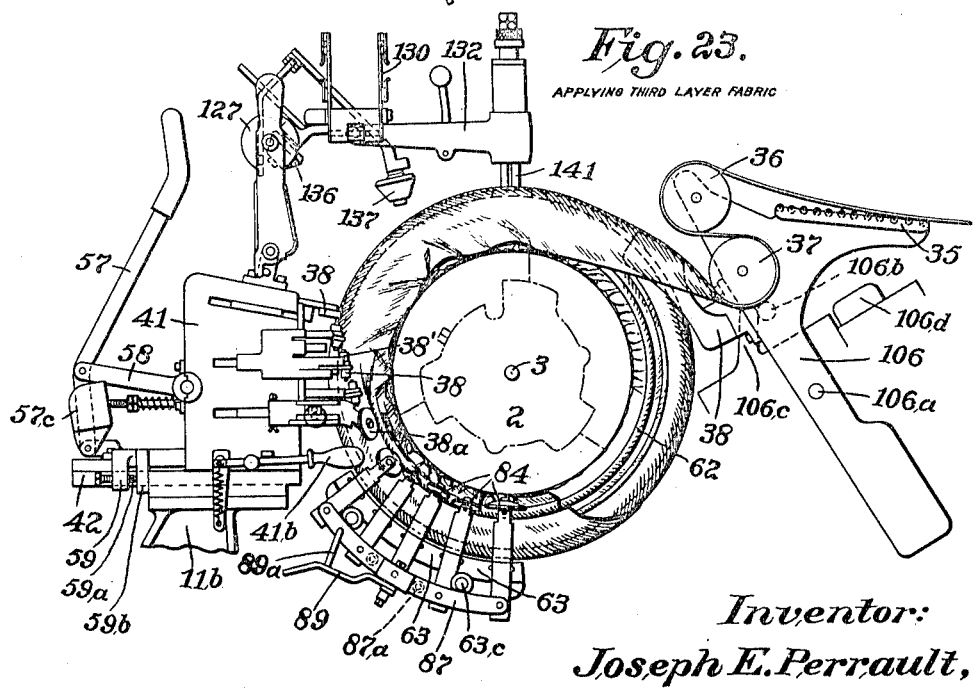

Fig. 23 is a similar view with the elements adjusted in applying the third fabric layer and likewise the fourth.

Fig. 24 is a similar view illustrating the trimming mechanism in operation, after the third and fourth layers of fabric have been applied.

Fig. 25 is a similar view, but on a larger scale and showing more in detail the structure, illustrating the elements adjusted to proper position for applying the chafing strips and top-cover and breaker strip simultaneously.

Fig. 25ᵃ shows the cross section of the carcass on the core developed to and including the operation of Fig. 25.

Fig. 26 is a diagrammatic showing of the parts adjusted to apply the side walls of the tire.

Fig. 27 is a similar view illustrating the elements in adjusted position to apply the tread, and Fig. 28 is a similar view illustrating the stripping operation preparatory to removing the completed carcass.

Referring by reference characters to these drawings, the numeral 1 designates the core upon which the tire is built, which is of sectional or collapsible type (indicated as a whole at 2) which is carried by suitable chuck arms on a shaft 3 journaled in the main frame of the machine. As the chuck and core per se form no part of the present invention and may be of any standard make, and as the manner of collapsing the same to remove the completed tire is well known to those skilled in the art, detailed illustration and description thereof is deemed unnecessary.

Means are provided for driving the shaft 3 at two different rates of speed for the purposes hereinafter described, which in the embodiment shown comprises a sleeve 4 rotatably mounted on shaft 3 (see Fig. 5) which carries fast thereon belt pulley 5 which is driven by belt 6 from any suitable source of power (not shown).

Sleeve 4 has keyed thereon a pair of spur gears of different size, the smaller of which 7 meshes with a gear 8 fast to the hub of a clutch member 9 journaled on a counter shaft 10 which in turn is journaled in suitable bearings in the frame parts or pedestals 11 and 11ᵃ which support the main shaft 3.

The larger gear 12 meshes with a gear 13 fast on the hub of a clutch member 14 (similar to clutch member 9, but reversely placed) which hub is likewise journaled on countershaft 10. Slidably keyed on the counter shaft 10 is a clutch hub or member 15 which has oppositely faced or inclined clutch faces 15$^a$ and 15$^b$ designed to coact alternately or selectively with clutch members 9 and 14 whereby the counter shaft may be driven from the sleeve 4 through either train of gearing at will. The counter shaft 10 has fast thereon a gear 16 which meshes with a gear 16$^a$ fast on shaft 3 whereby the latter (and with it the chuck and core) is driven from the counter shaft at the speed selected and in accordance with the requirements of the work being performed as will hereinafter appear.

The clutch member 15 is shifted by a shift lever 17 (Figs. 4 and 4$^b$) articulated on a pedestal 17' and having an offset cylindrical head 17$^b$ engaging the annular groove or channel of the clutch hub, the engaging portion of said part 17$^b$ being preferably provided with anti-friction balls as indicated in said Fig. 4$^b$. The shifter lever 17 is operated by a rod 18 which passes through an eye in the angularly turned end of the lever (Fig. 4) which rod is encircled by springs 18' on opposite sides of the lever and confined between tension adjusting nuts 19 and 20.

Rod 18 has one end connected to a block or member 21 which has a recess or transverse slot 21$^a$ therein, in which works a cam 22, the cam surface of which cooperates with and between a pair of rollers 21$^b$, the cam being provided with recesses 21$^d$ in which one or the other of the rollers rest at the extremity of movement in either direction. Cam 22 is fast on a shaft 23 which passes through an elongated slot 21$^c$ (dotted lines Fig. 4) in the wall of block or member 21, which shaft has fast thereon a gear 24 meshing with a pinion 25 operated by a hand lever 26 extending into convenient reach of the operator, which hand lever is preferably arranged to slidingly engage a detent member 27 having a recess or notch 27$^a$ in which the lever comes to rest at its neutral or idle position.

It is well understood that a tire is made up of, or comprises a plurality of strips or elements of varying character, such for example as the bias fabric which forms the main body of the carcass, the bead rings, the top cover and breaker strip, chafing strips, and tread strip, and as all these are well known to those skilled in the art, specific description thereof is unnecessary.

Figure 1:
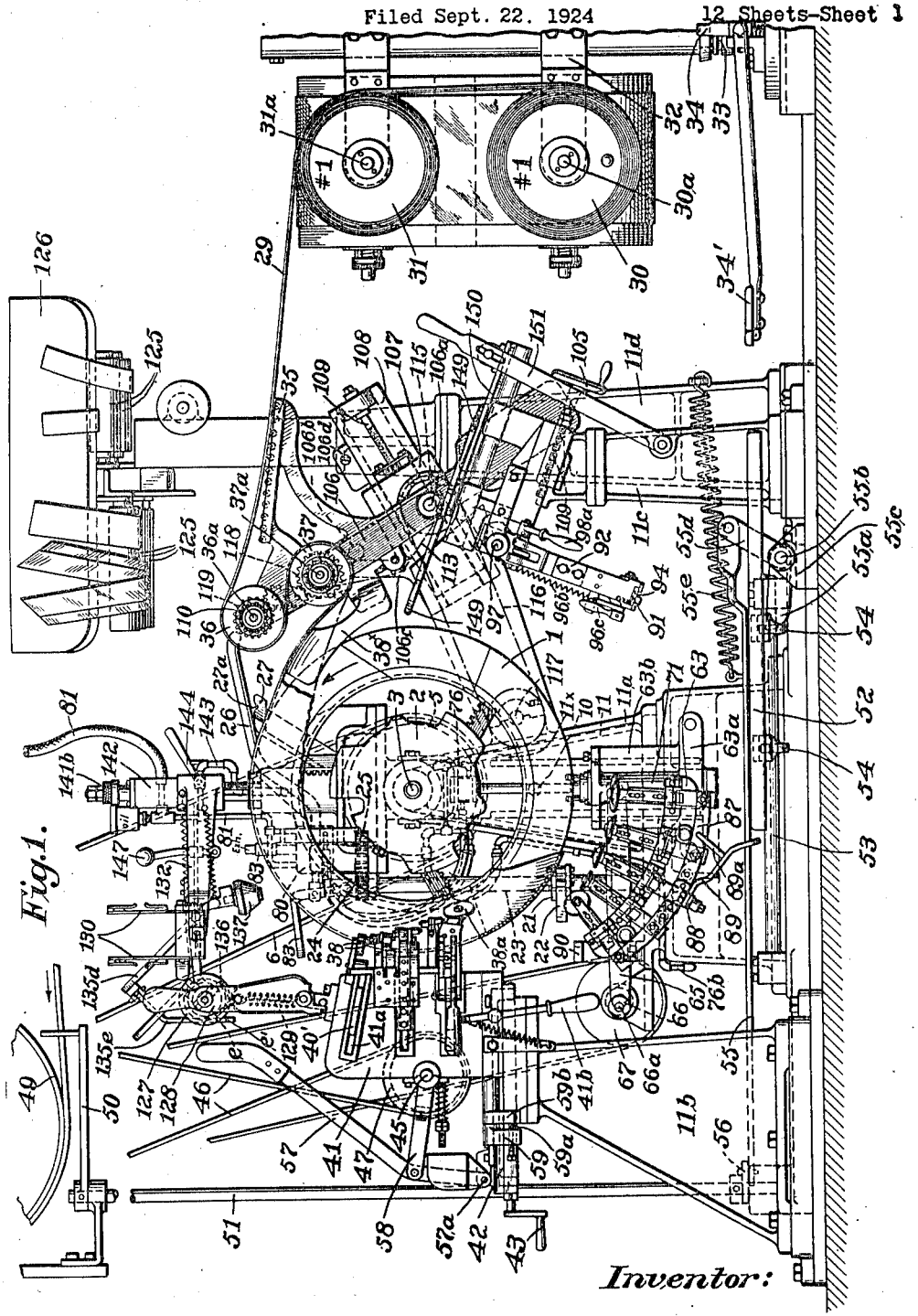
Figure 1 is a front elevation of said machine with certain of the material supply elements broken away or omitted, the parts adjusted to apply the first fabric layer.

My invention contemplates means for supporting these in position to be readily accessible to the operator and for feeding them at the proper time and in the proper manner, as well as the various instrumentalities by which they are applied. In the present case I have selected for the purpose of illustration, a tire in which four layers of (cord) fabric are used in making up the body of the tire, two of these being first applied to the core and the bead rings, then positioned thereon, after which the two remaining layers are applied over the core and bead rings. These fabric strips, in continuous lengths (indicated at 29) are wound on spools or drums 30 with an interposed liner to prevent the convolutions sticking together (as is customary) from which spools the fabric is unwound and led to the core as indicated in Fig. 1, the liner strip being wound up on a take-up roll 31. Said spools or drums are removably carried by spindles 30$^a$ and 31$^a$ which are carried by a rotatable turret member 32 journaled on a fixed vertical shaft member 33. Four pairs of spindles are provided to enable spools having fabric of different widths (the fabric which overlays the beads needing to be wider than that underlying them) and also to provide for the successive layers being applied to the core with the bias cords at a reverse angle.

Assuming that the core is in position in ring form, to have the fabric applied thereto, and has had its sides coated with cement, in the customary manner to cause the fabric to adhere thereto, the turret or head is rotated or positioned to bring the roll carrying the first layer of fabric to be applied in proper position, as indicated in Fig. 1, the turret being then locked in position by a locking device 34 controlled by treadle lever 34'. From the liner take-up roll the fabric strip is led over a guide table 35, preferably provided with anti-friction rollers, and over and around the guide and tension rolls 36 and 37 respectively. As it passes from beneath roller 37 it is led over a stationary curved (convex) guide or shell 38$^x$ the extremity of which lies in close proximity to the core and in alignment therewith, whereupon the free edge of the strip is pressed against the core to which it adheres. The core is then given a complete rotation by shifting the clutch to the slow speed drive position, which causes the fabric strip to be drawn from the supply and wound on the core under proper tension. At the completion of one rotation the fabric is torn across on a bias line at a point which will give a proper lap and the free edge being pressed down in overlapping position. The fabric is shaped down around the sides of the core during this operation or rotation.

The shaping of this layer of fabric around the core is performed by a battery of spring pressed roller devices which comprise pairs of rollers 38, etc., journaled to rotate about approximately vertical axes on pairs of carrying arms 39 etc., which arms are fulcrumed on the forwardly projecting ends of slides 40 etc., slidably mounted in guideways 41ª in a carrier member 41, the base of which is slidably mounted on a support 42 so as to be movable towards and from the core whereby the battery of rollers may be carried simultaneously into or out of operative position. The carrier head may be locked in its advanced position by a locking device or clamp (not shown) controlled by a hand lever 41ᵇ normally held in unlocked position by a spring (Fig. 25) movement in the locking direction (Fig. 22) being limited by a stop as shown. Support 42 is slidably supported on the upper end of a pedestal or frame 11ᵇ so as to be adjustable towards and from the core to adapt the machine for working on cores of varying diameter, such adjustment being effected by a screw operated by a crank handle 43.

The upper, inclined slide 40' is connected to the lower slides 40 by a link 40'', and the two lowermost slides 40 are connected by a cross head 40ˣ which in turn is connected by a pitman 44 with a crank shaft 45 driven by belt 46 passing around belt pulley 47, said belt being driven from an overhead pulley not shown, fast on a shaft carrying a main drive pulley 49 having an associate idle pulley to and from which the belt may be shifted by means of belt shifter arm 50 through vertical shaft 51. This in turn is operated from treadle plate 52 through rock shaft 53 to which the treadle plate is attached by arms 54 fast on said shaft, one of which overlies a lever arm 55ª fast on a rock shaft 55ᵇ suitably journaled in bearings in a bracket 55ᶜ which rock shaft has fast on one end a crank arm 55ᵈ connected by link 55 to an arm 56 on the shaft 51. Link 55 is under the tension of a strong spring 55ᵉ which tends to move the parts in such position as to keep the belt in idle position except when the operator presses on the treadle. (Any desired number of roller carrying fingers or arms may be provided, but I have found satisfactory results to be secured by the number and arrangement shown in the drawings.) This comprises a pair of arms 39 fulcrumed on the lower slide (Fig. 18) and carrying rollers 38 at their outer ends, said arms being pressed towards each other by springs 40ª. A pair of auxiliary arms 39ª are fulcrumed on arms 39 and carry other rollers 38', said arms being likewise pressed towards each other by springs 40ᵇ. The intermediate slide 40 is constructed to carry two pairs of similarly spring pressed arms 39, carrying other rollers 38 and each of these pairs of arms has fulcrumed thereon a pair of auxiliary spring pressed arms 39ª, likewise carrying rollers such as 38'. By this means six pairs of cooperating rollers are provided and it will be noticed that the dimensions of the arms is such that each succeeding pair of rollers from the top down, is positioned a little nearer the axis of the core. The upper slide 40' which carries the initial set of presser rollers, through similar spring pressed arms, is preferably arranged in inclined position, as shown.

It is important that the finger rollers should be started to reciprocating before they act on the fabric, and to this end I so arrange the connections that, when the carrier head is advanced, the finger rollers will be started simultaneously with the rotation of the core. For this purpose the belt 46 is driven from the overhead drive belt controlled by the belt shifter 50.

As certain tire operations are performed as hereinafter described, which do not require the action of the finger rollers, I provide means by which these are automatically stopped when the carrier head is retracted. To this end the pulley 47 is loose on shaft 45 and is provided with a clutch member which cooperates with a spring pressed clutch 47ª splined on the crank shaft and pressed normally into engaging position by the spring (Fig. 18).

This clutch is controlled by a shift lever 47ᵇ having a clutch engaging fork 47ᶜ, said lever being fulcrumed on a suitable arm or bracket carried by the head 41 (Fig. 3). A cam 47ᵈ carried by a frame part 47ᵉ is so arranged that when the carrier head is back the cam forces the lever in proper position to throw out the clutch against the tension of its spring, while forward movement of the carrier head carries the lever away from the high part of cam.

It is also desirable that the more advanced finger rollers should be pressed apart prior to their engagement with the core and the means for accomplishing this will now be described.

A handle lever 57 is provided fast on a rock shaft 57ª journaled in suitable bearings in the carrier head support, which lever is connected by a link 57ᵇ with the carrier head whereby the latter may be moved towards and from the core. This rock shaft carries fast thereon a pair of arms 57ᶜ which are designed to coact with spring retracted push rods 57ᵈ which are slidably guided by inwardly projecting lugs on the carrier head (Fig. 18) and have inwardly deflected inner ends which are pivotally connected to inwardly projecting arms 39ˣ of the arms 39. Stops 39ʸ are provided for limiting the movement of arms 39ª on arms 39.

The link 58 is connected to the lever at a point higher than the plane of the rods, so that said pivot point has a greater range of movement than points on arms 57ᶜ, which are in line with said rods, and the rear ends of the rods are so adjusted, as to length, that as the lever 57 is swung towards the core the arms 57ᶜ will press the rods 57ᵈ forward and swing the finger rollers apart, at about the time they are nearing the core, while further movement of the lever will project the carrier head so far forward that the rods will be moved back by their springs allowing the finger rollers to contact with the core.

The carrier head having been advanced, and the end of the fabric applied to the core as above described, the operator first shifts the belt to the fixed pulley by pressure on treadle lever 52, which causes the reciprocation of the roller carrying arms or fingers. The operator now starts the core to rotating by the main clutch mechanism hereinbefore referred to. The reciprocating action of the finger rollers pressing on the fabric causes this to be smoothly laid around and pressed against the sides of the core, the rollers acting successively against the fabric and core sides at points progressively nearer its axis, and the rollers, due to their rolling contact, avoiding any danger of damaging the fabric or distorting it.

It will be understood that in laying the first and second plies, or those which underlie the beads, the rollers should operate nearer the center of the core than in the operation of shaping the fabric over the beads (the third and fourth plies). To regulate this distance I provide the slide with a depending lug 59 carrying a set screw $59^a$ which in the position shown in Fig. 1, contacts with the head of the pedestal and limits the forward movement of the carrier head at the proper point, while when the carrier is to be held in a more retracted position a swinging lug $59^b$ is dropped into position between the set screw and carrier head.

Having applied the first layer to the core, the rotation of the latter is stopped, and the turret having been given a quarter turn to bring the next supply roll into position, the sequence of operations described in connection with the primary layer is then repeated.

In addition to the series of pairs of rollers 38, the lowermost slide carries a pair of discs or stitchers $38^a$, but as these are not utilized in the laying down or shaping of the first and second layers, and only come into action after the bead rings have been applied, description thereof will be reserved until their operation is described in the natural order, it being only noted at this time that during the application of the primary layers they are held apart in inoperative position, as shown in Fig. 2.

The next operation to be performed is the application of the beads, which, as is well known, are inextensible endless rings covered with rubberized or friction fabric. To enable these to be easily applied and accurately positioned, I provide a pair of bead carrying rings 60 and 61 for carrying the beads 62. The front carrying ring has a cross bar $60^a$ provided with an axial aperture to fit a pin or projection on the chuck shaft, as shown in Fig. 22, while the rear carrier is centered on the hub of the chuck by suitable lugs $61^a$, the upper one of which is shown in Fig. 3. The beads having been mounted on the carrier rings, these are pressed towards the core firmly until the beads are caused to adhere to the fabric previously applied thereto, after which the core is again rotated, preferably at high speed to save time, and the operator presses or works up the bead flaps against the fabric by a hand roller or stitching tool (not shown). (See Fig. 22.)

The turret having been given another quarter turn to bring the drum carrying the third layer in position, this is conducted to and has its end applied to the carcass, and one convolution thereof is wound around the core in the manner described in connection with the first layer. This and the fourth layer of fabric, in addition to being shaped down around the sides of the core, must be firmly pressed into the crease or angle formed at the outer edges of the beads and also around or over the sides thereof. To this end I utilize the reciprocating finger rollers for shaping the fabric down to the bead and the discs $38^a$ for working the fabric into the groove or channel formed by the bead. As the rollers 38 act in connection with the third and fourth layers precisely as in connection with the primary layers, repetition of the description is deemed unnecessary, the carrier being held in its second or partially retracted position by the spacing abutment, as shown in Fig. 23, and also utilize a segmental stitcher carrier 63 carrying stitcher rolls or discs operating in the manner hereinafter described. The stitchers $38^a$ are carried by arms $49^x$ to which they are connected by resilient brackets $49^y$, and which arms are fulcrumed at their rear ends on the slide and adapted to be drawn towards each other into working position by a tie rod $49^z$ connected to the rear arm and passing through an opening in the front arm where it is connected to a cam lever $49^n$ which, when swung outward into a position at right angles to that shown in Fig. 2, draws the arms together and forces the discs $38^a$ into contact with the fabric on the tire at or adjacent the base of the beads. As the carrier reciprocates these discs press and work the fabric firmly down into the channel formed by the beads. This stitcher segment is supported by bar $63^a$ carried by an elevating and lowering member $63^b$, Fig. 7, which is slidably (vertically) guided on a depending arm 64 (Figs. 4 and 5) fulcrumed on the shaft 3 between its main bearing and the head of the chuck, and which arm is swung to oscillate the stitcher carrier by a link or pitman 65 connected to a crank 66ᵃ on shaft 66.

This shaft is provided with fast and loose pulleys 67 and 68 adapted to be driven by belt 69 from an overhead pulley on the main drive shaft, which belt can be shifted by belt shifter 70 to start and stop the drive.

As the stitcher segment and associated parts are quite heavy, I provide power operated means for raising them into operative position, it being understood that during the application of layers 1 and 2 and the beads, as well as at certain other times, the stichers, not being required, must be lowered out of the way and clear of the core and tire parts thereon, as shown in Fig. 1.

I prefer to use fluid pressure means, such as pneumatic, for accomplishing this, and to this end the member 63ᵇ has (preferably integral therewith) a cylinder 71 within which works a piston 72 having a hollow or tubular piston rod 72ᵃ closed at its lower end and passing through a suitably packed cylinder head 71ᵃ. Its upper end connects with a port member which is pivotally connected to a projecting part of the hub 64ᵃ by a U-shaped member or fork 74. Within the piston rod 72ᵃ is a pipe 75 which extends from port block 73 down through and opens into the cylinder space below the piston. The annular space between hollow piston rod 72ᵃ and pipe 75 communicates with the interior of the cylinder by port 72ᵇ, so that admission of air under pressure to this annular space causes it to enter the cylinder and, acting against the cylinder head, to raise the cylinder and carrier 63, thus elevating the segment and stitcher rolls into working position. Air under pressure is introduced into said annular space within the cylinder through a flexible pipe connecting with a suitable source (not shown) through a controlling valve hereinafter described.

While the action of gravity might be relied on to lower the segment on the exhaust of air from the cylinder, I prefer to make the action positive, and to this end provide means for causing the sector to be forced down by compressed air also, such means comprising a flexible pipe 77 connecting the pipe 75 with the source of fluid pressure through the valve above referred to, and shown in Figs. 7 to 10. Pipe 76 has branches 76ᵃ and 76ᵇ which connect respectively with the control valve and a cylinder 78, the piston rod 78ᵃ of which is connected to the belt shifter 70, the parts being so arranged that when the valve is operated to elevate the sector the belt is shifted to the fast or drive pulley to start the oscillation of the sector, while when the valve is shifted to sector-lowering position, the belt is returned to the loose pulley by action of the spring 78ᵇ and the oscillation stopped.

The valve comprises a valve block 80 having supply ports 80ᵃ and 80ᵇ connected to air supply pipe 81 and leading to a central valve chamber in which works a reciprocating or piston valve 82 designed to be operated by a handle lever 83 fulcrumed on the frame part which supports the valve. Said piston valve has annular reduced portions 82ᵃ and 82ᵇ. Branch pipe 76ᵃ communicates with a port 80ᶜ in the valve block aligned with supply port 80ᵇ, while pipe 77 communicates with a port 80ᵈ aligned with supply port 80ᵃ. Said valve block is also provided with an exhaust 83' having spaced branches communicating with the valve chamber.

When the piston valve is moved to the limit of its movement in a left hand direction (Fig. 8) reduced portion 82ᵃ causes supply port 80ᵃ to be placed in communication with port 80ᵈ which results in compressed air being supplied to pipe 77 to lower the sector and allow the belt shifter to be returned by its spring 78 in the manner described, pipe 76ᵇ at this time being connected to the exhaust through reduced valve portion 82ᵇ and the supply being cut off. Movement of valve 82 to the right reverses the operation, putting supply port 80ᵇ in communication with port 80ᶜ and pipes 76, 76ᵃ and 76ᵇ, by way of reduced valve port 82ᵇ while supply port 80ᵃ is cut off and port 80ᵈ is placed in communication with the exhaust which effects the raising of the segment and the shifting of the belt to the fixed pulley, causing oscillation of the segment.

Adjustable means are provided for limiting the upward movement of the segment which, in the embodiment shown, takes the form of a screw 63ˣ carried by the member 63ᵇ and arranged to contact with a fixed abutment 11ˣ on the frame member 11ᵃ.

To secure the best results, the stitcher rollers or discs should be spring pressed towards each other and also be capable of being forced apart to prevent injury to the fabric in moving radially into and out of working position.

To this end the stitching discs, designated 84, are mounted on swinging arms 84ᵃ pivoted on suitable bearings in the segment 63, and having portions 84ᵇ extending below their pivots which are acted upon by spring 85 which tend normally to spread the said extended or rear ends apart and hence swing the stitcher rolls towards each other (see Figs. 19, 20 and 21). The springs 85 encircle bolts 86 between the heads thereof and the rear ends of the arms, which bolts pass through openings in the arms and are tapped into side bars 87. These side bars are mounted so as to be bodily movable towards and from each other, conveniently by providing them with inwardly projecting telescoping studs 87ᵃ slidably engaging tubular guides 63ᵃ in the segment 63 (see Figs. 20 and 21).

One side bar 87 has pivotally connected thereto approximately centrally thereof, one end of a link 88 which extends across beneath the segment and has its opposite end pivotally connected to the short end of a bell crank lever 89 fulcrumed on bar 87 (or a projection thereon), the long arm of the bell crank being shaped to function as an operating lever or handle. With said handle in the position shown in Figs. 19 and 21, the bars 87 and 87′ are separated and the springs tend to draw the rear ends of the arms apart and press the stitcher discs towards and into contact with the fabric on the core, while when the handle is swung through an arc of approximately 180° the bars are drawn towards each other, and the stitchers swung apart or opened, as shown in Fig. 20.

Preferably the bell crank 89 is so arranged that when swung in this last mentioned position its point of pivotal connection with the free end of the link crosses the dead center so that the parts will be automatically held or locked in open position. A projection 89ᵃ on the handle, contacting with bar 87 limits the movement of the handle in either direction.

The pairs of stitcher rolls 83 are arranged successively nearer the axis of the core, viewed from left to right, Fig. 23, so that they engage the fabric at gradually increasing distances from the angle formed by roller or disc 38ᵃ to the extreme inner edges of the core, and the rapid oscillation of the segment, as the core rotates, causes the fabric to be laid smoothly, evenly and snugly around the bead. By the parts cooperating in the manner above described, the third and fourth layers are applied to and shaped around the core in a manner that will be easily understood in the light of the explanation. The motion of the stitcher segment is very rapid relative to the speed of rotation of the core, and of short amplitude, preferably of about one inch.

At this point I may say that it is sometimes inconvenient to impart a very great range of vertical movement to the segment, due to floor conditions, etc., and to enable the segment to be positioned so as to facilitate removal of the finished tire from the core, I make the segment bodily shiftable into and out of the plane of the core, this being accomplished by having it slidably mounted on rods or bars 63ᶜ projecting horizontally from bar 63ᵃ. To prevent the segment being accidentally raised (on admitting air to the lifting cylinder) when not in aligned position, I provide a rigid projecting bar 90 which, when the segment is pushed back, overlies the latter and prevents its upward movement. Said bar has a notch 90ᵃ which permits the bar 63ᵃ to have up and down movement, as shown in Fig. 4, only when the sector is in alignment with the core.

Having completed the laying on of the fabric layers and beads, as above described, the next thing to be done is to trim off the fabric at the bases of the beads. To accomplish this I provide a pair of independent trimming knives adapted to operate simultaneously on opposite sides of the core, the construction and operation of which will be clear from Figs. 12 to 14 inclusive, which show said mechanism in detail on an enlarged scale, and Fig. 24, which illustrates the trimming operation. These knives designated 91, are slidably mounted in a pair of arms 92 which are mounted to be slidable towards and from each other and have movement about a horizontal axis, being supported from a pedestal or frame part 11ᶜ preferably located beneath the tension rollers. The knives are preferably made with dovetailed shanks, in which they are removably clamped by bolts 93 in dove-tailed slots formed in the inner faces of slides 94 suitably guided in the angularly turned ends 92ᵃ of the arms 92. Each slide 94 carries a rack 94ᵃ which is engaged by a pinion 95 fast on a short shaft 94 journaled in arm 92 and having secured to and wound around an exposed portion thereof a flexible band 96ᵃ which is connected by a tension spring 96ᵇ to a relatively remote portion of the arm. The pull of the spring on the flexible band tends to unwind the same and hence keep the knife retracted and its cutting edge covered or protected by the angular end of the arm, as shown at the top, Fig. 12.

Each shaft is provided with a handle 96ᶜ which may be grasped by the operator whereby the shafts may be turned to project the knives into cutting position. Movement of the handles in the reverse direction is limited by stops 96ᵈ. Normally the arms are swung down out of the way as shown in Fig. 26, and are only swung up into the position shown in Fig. 24 when the cutting or trimming action is to be performed. To enable them to be thus operated and locked in elevated position, the arms 92 are provided with hub members 92ᵇ and 92ᶜ, which are pivotally mounted on a shaft 97, rigidly supported by the brackets 97ᵃ, carried by an adjusting member 97ᵇ supported from the pedestal 11ᶜ. A shaft 98 journaled in one of the arms 92 adjacent the hub 92ᶜ thereof, and provided with an operating handle 98ᵃ, has a crank arm 98ᵇ which is connected by a link or pitman 99 with the hub 92ᵇ so that by movement of the handle in one direction the hubs may be brought together while on movement in the other direction they will be separated to the limits allowed by the bearing brackets 97ᵃ.

Shaft 97 is encircled by a sleeve 100 slidably and rotatably mounted on the shaft, one end of the sleeve being rigidly connected to and forming a bearing liner for the hub 92ᶜ, while hub 92ᵇ is splined to sleeve 100 by key 100ᵃ.

Hub members 92ᵇ and 92ᶜ carry abutments 101 which are provided with hardened wear plates 101ᵃ and 101ᵇ which are designed to coact with contact plates or abutments 102 on the supporting member 97ᵇ. Separation of the sleeves apart by the operation of the handle 98ᵃ carries the wear plates 100ᵃ and 100ᵇ out of line with the abutments 102, which allows the sleeve and hubs to rotate to lower the arms 92 into the position shown in Fig. 26, where they are out of the way.

Wear or contact plate 101ᵇ has a lateral projection $b$ at the upper edge thereof which is adapted to overlap its cooperating abutment 102 when the hub is moved out in arm releasing position, and when the arms are elevated this abutment arrests their upward movement in proper position for trimming and lateral movement towards each other.

When it is desired to trim the fabric adjacent the inner edges of the beads, the operator swings the arms upwardly to the limit allowed by stop $b$ and then turns handle 98ᶜ in the proper direction to draw their hubs together, in which position they are locked against downward movement by the cooperation of wear plates 100—101ᵃ and abutments 102 as above described, being properly centered by spacing lug 103. Thereafter the operator grasps the handles 96ᶜ and rotates them in the proper direction to project the knives into contact with the fabric on the rotating core, which cuts through the layers of fabric thereon. In Fig. 12, to better illustrate the action the upper handle is shown in the position assumed before knife projection and the lower one after knife projection.

To enable the cutters to be adjusted in position for operating on tires of varying sizes, the member 97ᵇ is slidably mounted on the upper end of the pedestal 11ᶜ and is capable of being moved toward and from the core by screw 104 and hand wheel 105.

At this point, and before proceeding to describe the succeeding steps in the building of the tire and the mechanism for accomplishing the same, it is desirable to more specifically describe the manner of mounting and operating the tension rolls, as the adjustment and use of these varies according to the character of material being fed to the core, and it being further desirable that these rollers and associated parts should be capable of being swung back clear of or away from the core during certain operations, as for example, during the trimming, as illustrated in Fig. 24 above referred to.

To this end the said guide and tension rollers 36 and 37, guide shoe or shell 38, and anti-friction feed table 35, are carried by a frame member 106 which is pivotally mounted, as at 106ᵃ, on a slide 107 supported by an inclined guide member 108 fast on the supporting pedestal or frame part 11ᵈ. Slide 107 is preferably connected to the guide member 108 by a dove-tailed connection and is operated by screw 109 provided with a non-circular head for the reception of a suitable wrench or handle whereby the axis of frame member 106 may be adjusted towards and from the core according to the size of core in use. The rolls 36 and 37 are rotatably mounted on shafts 36ᵃ and 37ᵃ which are journaled in the frame member 106 which in turn are driven positively at slightly different rates of speed. Each of the rolls 36 and 37 is adapted to be coupled to and uncoupled from its shaft by a clutch member 110 slidably splined on the projecting end of the shaft (Fig. 15) by the use of a spring key 111 which, through its frictional engagement serves to hold the clutch member in either clutched or unclutched position, said clutch member preferably having a flange 110ᵃ provided with circumferentially arranged holes 110ᵇ to readily engage a pin 112 on the end of the roller.

The lowermost roller 37 is driven at the proper rate of speed by a sprocket chain 113 passing around sprocket wheel 114 on shaft 37ᵃ and around a sprocket 115 on the shaft 106ᵃ which constitutes the pivot of the frame member 106, which shaft is in turn driven by chain and sprocket connections (Figs. 1 and 2) from a shaft 117 driven from the main drive gear, the connections being so arranged and timed that the lower roll is driven at a speed which is calculated to give the best tension results for fabric feed, during which time roll 37 is relied on wholly for tension or retardation and is clutched to its shaft while roller 36 is unclutched and operates as an idle roller. The amount of retardation securing the best results is approximately 21% relative to the peripheral speed of the core. For applying the tread, due to the fact that this is wholly of rubber, a less retardation is desired and to this end I provide means for driving the tread tension roll 36 at a faster rate of speed, which means preferably takes the form of a gear 118 on shaft 37ᵃ having, say twenty-six teeth which, through a pair of idle or transmitting gears, drives a gear 119 fast on the shaft 36ᵃ, and having, say twenty-four teeth, which will result in driving roll 36 at a speed calculated to give a retardation of approximately 11% relative to the peripheral speed of the core.

The position of frame member 106 is limited by a stop pin 106ᵇ which in the forward position contacts with an abutment 106ᶜ and in the rear position with an abutment 106ᵈ.

Having completed the trimming of the edges of the fabric, as previously described, the carcass is now ready to receive the top cover and breaker-strip, which are fed in as a unit and at the same time the chafing strips are fed in, whereafter the side walls are applied, these being shown conventionally in Fig. 3ᵇ.

The top cover and breaker-strip combined comprise a strip of coarse rubberized fabric superposed on a wider strip of rubber compound, as shown at the top of Fig. 3ᵇ.

The chafing strips, of which there are two, one for each side of the tire, one being shown at the bottom in Fig. 3ᵇ, are likewise composed of rubberized fabric of two layers in overlapped relation, and one of the side walls covers is shown at the center of said figure, which strip is of rubber compound only, or contains no fabric. These, with the tread strip, which is a relatively thick slab of rubber, comprise the final elements which go to make up the tire, and they are wound on drums or spools 120 with the customary interwound liner strips, which spools are removably mounted on stub shafts 121 on which they are held by keys or collars 121ᵃ (Fig. 3ᵃ) which shafts are provided with friction brakes 121ᵇ to prevent too free movement of the spools in unwinding. These stub shafts are carried by bracket arms 122 which are clamped to a rearwardly and upwardly inclined frame member 11ᵉ. Immediately above each stub shaft 121 is a similar stub shaft 123 which is designed to removably hold a liner take-up spool 123ᵃ.

From each supply spool 120 the strip is conducted over the liner take-up roll or spool 123ᵃ to which the end of the liner is attached, and thence the respective strip is led over or around guide rollers 124, 125 carried by frame parts, as clearly shown in Fig. 3, their free ends being laid upon an inclined table or shelf 126 convenient to the operator and adjacent the core.

The trimming knives having been dropped down out of the way and the tension roller carrier 106 having been returned to the position shown in Fig. 1, the operator now proceeds to apply the top-cover and breaker-strip and the chafing strips. For this purpose the ends of said strips are removed from the table 126 and conducted under the roller 36 and led forward to the fabric covered core to which their ends are caused to adhere, the top-cover and breaker centrally of the periphery of the core and the chafing strips on opposite sides thereof, as shown in Fig. 25, which shows the parts in position after the core has made approximately a half rotation. As the core rotates the top cover is rolled down on the underlying layers of fabric by a concave roller 127 carried by a lever 128 which is carried by the finger-roller head and which is pressed down on the core by springs 129, such lever having, during the previous operations, been swung back out of the way, as shown in Fig. 1, in which position it is held by an abutment 128ᵃ contacting with a pin 128ᵇ carried by the mounting for the lever 128 on top of the finger-roller head and the action of the springs 129 which have crossed the dead center.

The top edges of the chafing strips are guided to proper position relative to the sides of the core by being passed under downwardly projecting guide fingers 130ᵃ carried by arms 130 depending from a block 131 swiveled on a horizontal axis and supported from an arm 132. This arm has a forked portion 132ᵃ which carries a shaft or axle 133 on which said block 131 is pivotally mounted (see Figs. 5, 6 and 6ᵃ) by a transverse pivot pin passing through a pivot bearing in the head 133ᵃ, shown in dotted lines in Fig. 6.

A handle 130ᶜ is attached to the block whereby the guide arms may be swung up out of the range of the core when not desired for use, as shown in Fig. 22, the arms being held in this position by a spring latch 130ᵈ engaging a pin 130ᵉ.

Pivotally mounted on shaft or axle 133 is a pair of arms 134 and 135 which have abutments or angularly turned portions on which are rotatably mounted a pair of application rolls 136 and 137. Each of these rolls has two truncated conical portions, an upper relatively narrow portion designed to coact with the upper edge of the respective chafing strip, as shown in Fig. 25, and a lower broader portion designed to coact with the side walls, as hereinafter described, the arm being held in a lower position during the first mentioned operation and an elevated position during the latter operation. These arms are adapted to be pressed apart or separated normally by springs 138 and 139, connected at one end to the hub of the arm 132 and at the other end to the arms 134 and 135 respectively, the former connection being made through a flexible element of strap 138ᵃ and the latter to a screw eye or the like on arm 135. These springs thus tend to swing the arms to carry the rolls away from each other. Outward movement of arm 134 is limited by a projection 134ᵇ contacting with a stop 132ᵇ and said arm is held in such outward position by a locking device in the shape of a member 139ᵃ having a beveled portion to cooperate with a projection 134ᶜ. Said locking device is carried on the outer end of a locking rod 140 and is held against turning movement by guide pin 134ᵈ.

Arm 132 has its hub mounted to swing about the post 141, which is rigidly supported by a frame part, and also to be vertically movable thereon to hold the rolls 136, 137 at either of the two positions (high or low) heretofore referred to, and means are provided by which said arm and the parts carried thereby may be elevated by power (compressed air) and lowered by gravity and the locking bolt is so arranged that the rolls will be locked in separated position at all times except when positioned adjacent the core.

To this end the arm 132 is carried by a cylinder 142 slidable and rotatable on the post, which post has a reduced upper portion 141ᵃ forming a compresser air chamber, said reduced portion extending through the cylinder head and being threaded at its outer end to carry adjustable stop and lock nuts 141ᵇ. The post is provided with a longitudinal central passage 141ᶜ which communicates at its upper end by lateral port with the air chamber and at its lower end with a pipe 143 communicating with a source of air under pressure (not shown) and provided with a two-way valve 144 by which air may be admitted to or exhausted from the cylinder at will. When this valve is in position to admit air to the cylinder it will be raised to the limit allowed by the nuts 141ᵇ, as shown in Fig. 5, and the rolls will be positioned to cooperate with the side walls, while when air is exhausted the cylinder will be lowered to the limit allowed by stop member or collar 145 which can be removed and replaced by one of different height according to the size of tire being built, at which time the rolls will be in position to cooperate with the chafing strips, as shown in Fig. 25.

The post 141 has a keyway or longitudinal groove 141ᵈ in the side facing the core into which the end of the rod 140 can project when the arm 132 is swung front into a position perpendicular to the plane of the tire, which movement withdraws the locking piece 139 from engagement with arm projection 134ᶜ, thus permitting the rolls 136, 137 free movement to be clamped down to their working position.

The rod 140 is pressed towards the post by spring 146 and moved against the tension of the spring by hand lever 147.

Arms 134 and 135 carry lever extensions 134ᵈ and 135ᵈ respectively, one of which carries a swing latch 135ᵉ having notches or shoulders e and e′ designed to engage the arm 134ᵈ to hold said arms 134ᵈ and 135ᵈ pressed apart and hence the rolls 136 and 137 pressed against the material on the core.

Shoulder e is used when the rolls are in position for applying the chafing strips and shoulder e′ when in side wall applying position.

With the free ends of the side walls and chafing strips attached to the foundation fabric, as above described, and the application rolls 136 and 137 and composite roller 127 in position, the machine is now started to revolve the core, the finger-roller head being in its second position, or held back one step from the core by the swinging abutment 59 and the stitcher sector elevated, it being understood at this time that the upper tension roller 36 is uncoupled from its shaft so that it acts as an idle roller, the tension of the several strips now being applied being secured by the friction clutches 121ᵇ, heretofore referred to. As the core rotates, the strips are drawn in, the chafing strips being held at the proper elevation by the guide fingers 130ᵃ and their upper edges being pressed against the sides of the core by the upper truncated conical faces of the rolls 136, 137, the inclination of which is made to fit the inwardly converging core walls at the point of contact. Continued rotation of the core causes the breaker-strip and top-cover to be pressed down by the composite roller 127. The margins of the breaker-strip and top-cover are worked smoothly down and caused to firmly adhere to the underlying fabric, and in a similar manner the chafing strips are worked down over the beaded sides by the battery of stitches in a manner which will be clear from Fig. 5, in view of the preceding description of these parts.

The main function of the presser roller 127 is to initially press the breaker-strip and top-cover into adhering contact with the underlying fabric to prevent any likelihood of the edges buckling as the finger-rollers cross the same in their reciprocation. This presser roller is preferably formed in three sections, as shown in Figs. 2 and 3, consisting of the central section 127ᵃ, having a concave periphery, and two side sections 127ᵇ having slightly beveled edges for action on the extending edges of the top cover. These sections are all loosely mounted on a shaft carried by lever 128 which is of a divided nature, comprising parallel arms carrying a cross shaft on which the roller sections are mounted, the two end sections being pressed towards each other by springs, as shown. This arrangement gives them a floating and yielding action, and centers them in relation to the core and tire material thereon. After a complete rotation has been made, and the chafing strips and top-cover and breaker-strip applied as above described, the machine is stopped, the top-cover and breaker-strip cut straight across with allowance for a properly lapped joint, and the chafing strips are severed on a bias (it being understood that these are of bias fabric) the severance being also with allowance for a lapped joint. Thereafter the core is rotated sufficiently to pass the joints by the side and top application rolls and the top pressure roller, after which it is raised to inactive position, while the side application rolls are elevated by the admission of compressed air to the cylinder 142, bringing them into the position shown in Figs. 5 and 26, where they are in readiness to act on the side walls. The stitcher sector is now lowered away from the core, it not being needed in the further tire building operations.

The free ends of the top-cover and breaker, and chafing strips are now withdrawn from the roll 36 and laid back upon the table 126. The ends of the side wall strips are now removed from the table 126 and passed underneath the guide roll 36, as indicated in Fig. 26, and thence over the guide fingers 130", which gauge their lower edges relative to the tire sides and the rotation of the core causes these to be initially pressed against the underlying fabric by the truncated cone-shaped application rolls, the said side walls being worked down by the reciprocating finger-rollers in a manner which will be readily understood.

The next step is the application of the tread strip and the ends of the side wall supply strips having been withdrawn and returned to the table 126, the conical application rolls having been swung out of the way, as shown in Fig. 27, a tread strip is led over its tension roll 36, which is clutched to its drive shaft for this operation, and then around roller 37 which is unclutched, and thence over the guide shell 38 to a point of contact with the carcass, where its end is caused to adhere to the surface of the same centrally of the periphery thereof. The roller 127 is then swung down against the tire surface and the finger roller head having been left in working contact with the tire, the rotation of the core causes the tread strip to be pressed into intimate contact with the underlying carcass by the roller 127 and the reciprocating finger rollers to work said strip down smoothly and evenly. It is to be understood that during this and the preceding operation, to wit, the application of the side walls, the lower set of rollers or stitchers on the finger roller head, are left in operation by the means heretofore described, being helpful in these operations. The tread strip is applied to the tire in a given length predetermined preferably by weight and such that under the tension or stretch determined by the retardation of the tread roller 36, its ends substantially meet for a butt joint. To cause it to be led under even tension throughout its entire extent, the tension must be maintained to the very end, and to accomplish this I attach to the rear end of the tread strip a follower or strip of canvas or other textile material, indicated at 148, on which the tension roller acts until the tread strip has been completely fed into position, after which the canvas strip is detached from the tread and the latter adjusted and smoothed down at the joint by the operator. Thereafter the core is rotated at high speed and the presser roller 127 and finger rollers and groove stitching roller being in operative position, the finishing touches are given to the carcass, which is then ready for removal.

As the margins of the initial layout were cemented to the core at the start, this involves some difficulty in removal of the carcass, and to enable it to be expeditiously performed I provide a pair of stripping members or hooks, which are shown in stripping operation in Fig. 28, and in detail in Fig. 11. These comprise a pair of hooks 149, which are pivotally carried on a slide 150, mounted above the trimmer support, as shown in Figs. 1, 11 and 28, which slide is capable of being advanced by a lever 151 fulcrumed on the pedestal 11$^c$, and to such position that their hooked ends may be engaged under the edges of the tire. By then rotating the core slowly and pulling back on the handle lever (to the right, Fig. 28), the ends of the hooks are worked under the edges of the tire between it and the core and the tire loosened therefrom. The core may then be collapsed and the tire removed, whereafter the free edges of the chafing strips are folded in by hand, or in any desired manner around the inner edges of the completed tire, as is customary.

The building is now complete and the tire is ready to be subjected to the vulcanization molds.

I may add that high speed of the machine is used in three operations:

First: To dry quickly the cement applied to the core before application of the fabric.

Second: During operation of rolling or stitching the beads into place on completion of the first operation or laying of fabric before the bead is applied.

Third: During operation of trimming surplus stock at the inside diameter of the bead on completion of the second operation or laying of fabric over the bead.

The remainder of the operations are performed at low speed.

Having thus described my invention, what I claim is:—

1. In a tire building machine, the combination with a revolvable core and means for feeding covering strips thereto, of strip applying means comprising a plurality of reciprocating presser finger members, and a segment mounted to oscillate in a path concentric to the core, said segment carrying a plurality of pairs of cooperating rollers.

2. In a tire building machine, the combination with a revolvable core and means for feeding covering strips thereto, of strip applying means comprising a plurality of reciprocating presser finger members, and a segment mounted to oscillate in a path concentric to the core, said segment carrying a plurality of pairs of cooperating rollers, and means for moving said segment towards and from the core.

3. In a tire building machine, the combination with a revolvable core and means for feeding covering strips thereto, of strip applying means comprising a plurality of reciprocating presser finger members, and a segment mounted to oscillate in a path concentric to the core, said segment carrying a plurality of pairs of cooperating rollers, and means for moving said segment towards and from the core, and also for moving it out of the plane of the core.

4. In a tire building machine, the combination with a revolvable core, and means for feeding covering strips thereto, of strip applying means comprising a plurality of reciprocating presser finger members, and a segment mounted to oscillate in a path concentric to the core, said segment carrying a plurality of pairs of cooperating rollers, and power means for moving said segment towards and from the core.

5. In a tire building machine, the combination with a revolvable core, and means for feeding covering strips thereto, of strip applying means comprising a plurality of reciprocating presser finger members, and a segment mounted to oscillate in a path concentric to the core, said segment carrying a plurality of pairs of cooperating rollers, and pneumatic means whereby said segment is moved towards and from the core.

6. In a tire building machine, the combination with a revolvable core and means for feeding covering strips thereto, of a segment mounted to oscillate in a path concentric to the core, a plurality of pairs of cooperating rollers carried thereby, means for moving said rollers towards and from each other, and means for moving said segment towards and from the core.

7. In a tire building machine, the combination with a revolvable core and means for feeding covering strips thereto, of a segment mounted to oscillate in a path concentric to the core, a plurality of pairs of cooperating rollers carried thereby, means for moving said rollers towards and from each other, and pneumatic means for moving said segment towards and from the core.

8. In a tire building machine, the combination with a revolvable core and means for feeding covering strips thereto, of an arm pivoted to swing about the axis of the core, means for swinging said arm, a segment slidably supported on said arm and having a plurality of pairs of cooperating rollers, and means for moving the segment relative to said swing arm.

9. In a tire building machine, the combination with a revolvable core and means for feeding covering strips thereto, of an arm pivoted to swing about the axis of the core, means for swinging said arm, a segment slidably supported on said arm and having a plurality of pairs of cooperating rollers, and pneumatic means for moving the segment relative to said swing arm.

10. In a tire building machine, the combination with a revolvable core and means for feeding covering strips thereto, of an arm pivoted to swing about the axis of the core, means for swinging said arm, a cylinder member slidably guided by said arm, a piston member held against vertical movement but pivotal about said axis, means for admitting fluid under pressure to and exhausting it from the cylinder, a segment supported from said cylinder member, and a plurality of pairs of cooperating rollers carried by said segment.

11. In a tire building machine, the combination with a revolvable core and means for feeding covering strips thereto, of a segmental carrier mounted to oscillate circumferentially of the core and movable also radially of the core, a plurality of pairs of arms pivotally supported by said segmental carrier, rollers carried by said arms, springs acting on said arms for pressing the rollers of each pair towards each other, and means for forcing the rollers apart against the tension of the springs.

12. In a tire building machine, the combination with the revolvable core and means for feeding covering strips thereto, of a segmental carrier mounted to oscillate circumferentially of the core and movable also radially of the core, a plurality of pairs of arms pivotally supported by said segmental carrier, rollers carried by said arms, spring acting on said arms for pressing the rollers of each pair towards each other, and means for forcing the rollers apart against the tension of the springs comprising parallel bars overlying said arms, and means for moving said bars towards and from each other.

13. In a tire building machine, the combination with the revolvable core and means for feeding covering strips thereto, of a segmental carrier mounted to oscillate circumferentially of the core and movable also radially of the core, a plurality of pairs of arms pivotally supported by said segmental carrier, rollers carried by said arms, springs acting on said arms for pressing the rollers of each pair towards each other, and means for forcing the rollers apart against the tension of the springs comprising parallel bars overlying said arms, a hand lever fulcrumed on one of said bars and having a bell crank extension, and a link pivotally connecting the other extension to said other bar.

14. In a tire building machine, the combination with a revolvable core and means for feeding covering strips thereto, of an arm mounted to swing about the axis of the core, a member mounted to slide lengthwise of said arm, power means for sliding the same, a segment supported by said arm and movable into and out of the plane of the core, and pairs of cooperating rollers carried by said segment.

15. In a tire building machine, the combination with a revolvable core and means for feeding covering strips thereto, of an arm mounted to swing about the axis of the core, a member mounted to slide lengthwise of said arm, power means for sliding the same, a segment supported by said arm and movable into and out of the plane of the core, pairs of cooperating rollers carried by said segment, and means for rendering said power means inoperative except when the segment is positioned in the plane of the core.

16. In a tire building machine, the combination with a revoluble core of a segment mounted to oscillate in a path concentric to the core and also movable radially of the core, means effecting said radial movement, and means for effecting the oscillating movement of the segment, and means whereby the starting and stopping of the oscillating means is automatically operated coincident with the radial movement towards and from the core.

17. In a tire building machine the combination with a revoluble core, of a segment mounted beneath the same to oscillate in a path concentric thereto, fluid actuated means for elevating the segment, normally disconnected means for oscillating the segment, and means whereby the said normally disconnected means are automatically connected to oscillate said segment simultaneously with the admission of fluid to said fluid actuated means.

18. In a tire building machine, a revoluble core, a segment mounted therebeneath for movement towards and from the core and also for oscillation in a path concentric to the core, means for elevating and lowering the segment, driving means for oscillating the segment, and means for automatically operatively connecting said driving means on elevation of the segment and disconnecting said driving means on lowering the segment.

In testimony whereof, I affix my signature.

JOSEPH E. PERRAULT.